United States Patent [19]

Atkinson et al.

[11] Patent Number: 5,010,925
[45] Date of Patent: Apr. 30, 1991

[54] NORMALLY CLOSED DUCKBILL VALVE ASSEMBLY

[75] Inventors: Gordon E. Atkinson, Cedarville; James C. Bailey, Yellow Springs, both of Ohio

[73] Assignee: Vernay Laboratories, Inc., Yellow Springs, Ohio

[21] Appl. No.: 506,142

[22] Filed: Apr. 9, 1990

[51] Int. Cl.$^5$ ............................................. F16K 15/14
[52] U.S. Cl. ..................................... 137/847; 137/846
[58] Field of Search ........................ 137/846, 847, 850

[56] References Cited

U.S. PATENT DOCUMENTS

| | | | |
|---|---|---|---|
| 3,320,972 | 5/1964 | High et al. | 137/846 |
| 3,504,699 | 4/1970 | Grise | 137/846 |
| 3,773,233 | 11/1973 | Souza . | |
| 3,822,720 | 7/1974 | Souza | 137/846 |
| 3,896,849 | 7/1975 | Ervin | 137/847 |
| 4,181,145 | 1/1980 | Mitchell . | |
| 4,341,239 | 7/1982 | Atkinson . | |
| 4,434,810 | 3/1984 | Atkinson . | |
| 4,436,519 | 3/1984 | O'Neill . | |
| 4,524,805 | 6/1985 | Hoffman . | |
| 4,535,819 | 8/1985 | Atkinson et al. . | |

FOREIGN PATENT DOCUMENTS

| | | | |
|---|---|---|---|
| 719253 | 4/1942 | Fed. Rep. of Germany | 137/846 |
| 2094443 | 9/1982 | United Kingdom | 137/846 |

*Primary Examiner*—Robert G. Nilson
*Attorney, Agent, or Firm*—Biebel, French & Nauman

[57] ABSTRACT

The present invention provides a valve assembly for allowing fluid flow in a first direction and for preventing fluid flow in a second, opposite direction including a valve housing having first and second ports opening into the housing. A flow regulator is positioned within the housing and includes an outer wall which is formed as a substantially cylindrical member. The regulator includes a pair of semi-circular valve lips which are oriented in converging relationship to each other to form an outlet slit at one end of the regulator. The valve lips are connected to the outer wall by a pair of concave connecting walls wherein the lips and connecting walls form a pair of cavities on either side of the outlet slit. A pair of elongated projections are located along diametrically opposing sides of the outer wall for biasing the outer wall inwardly whereby a biasing force is applied to close the lips.

13 Claims, 2 Drawing Sheets

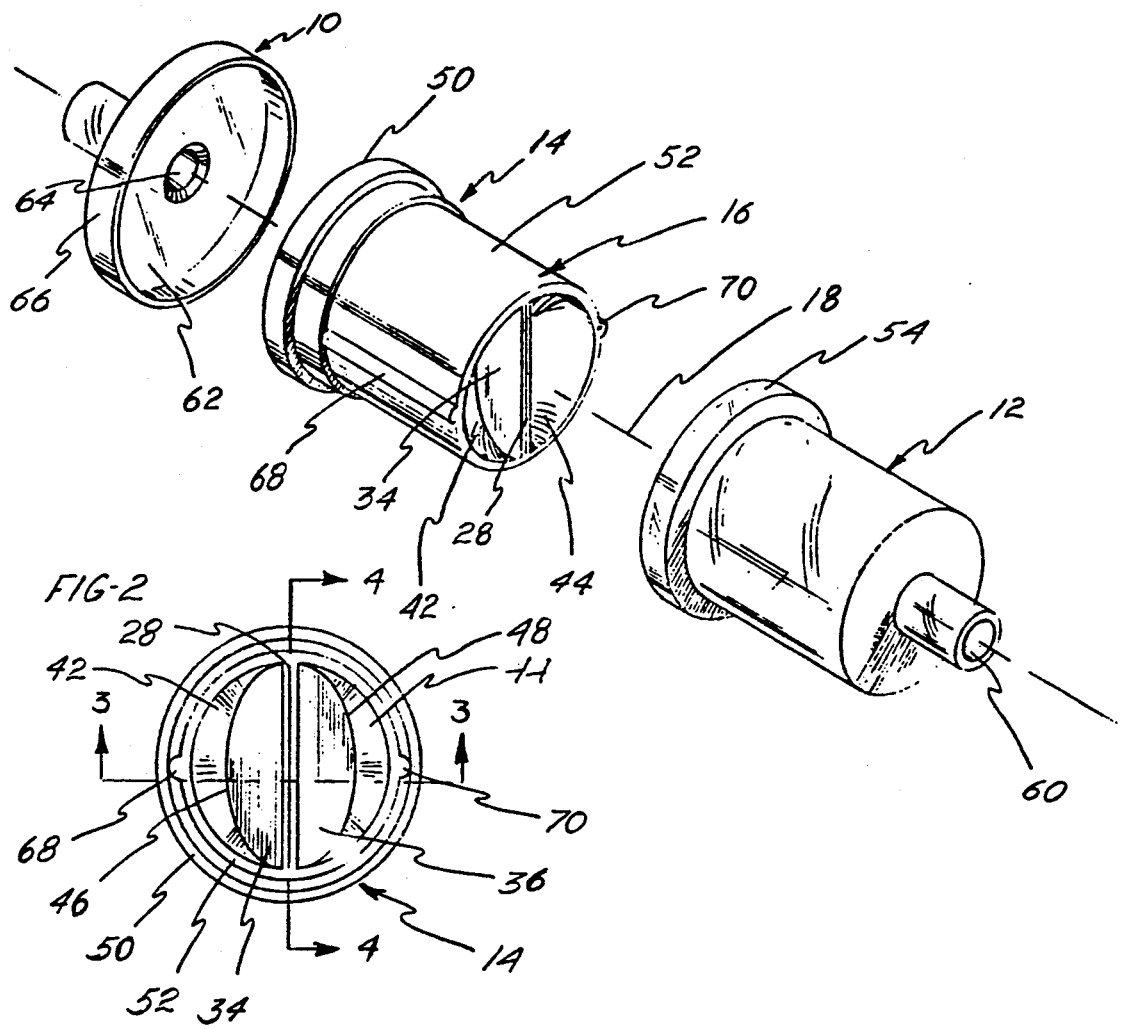
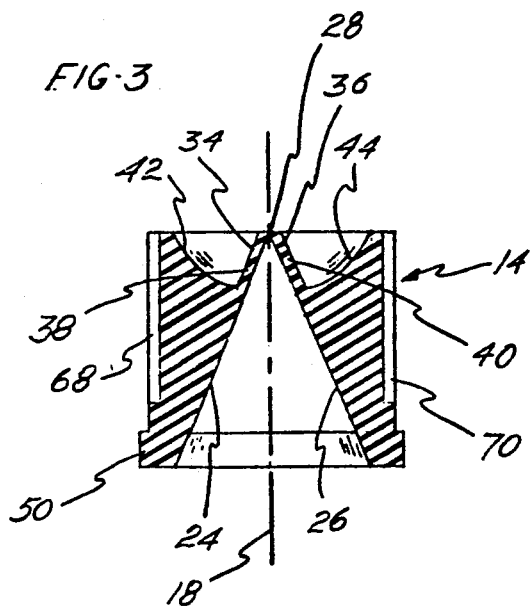
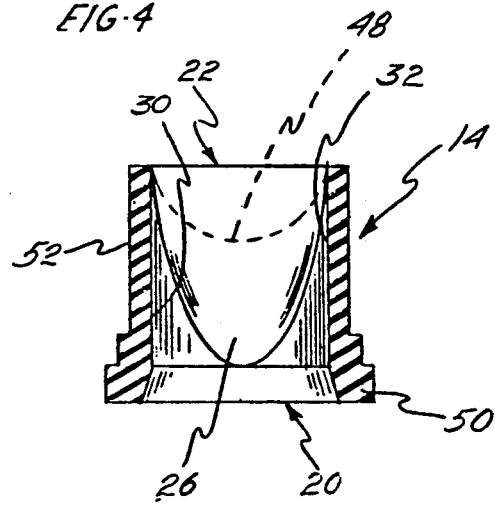

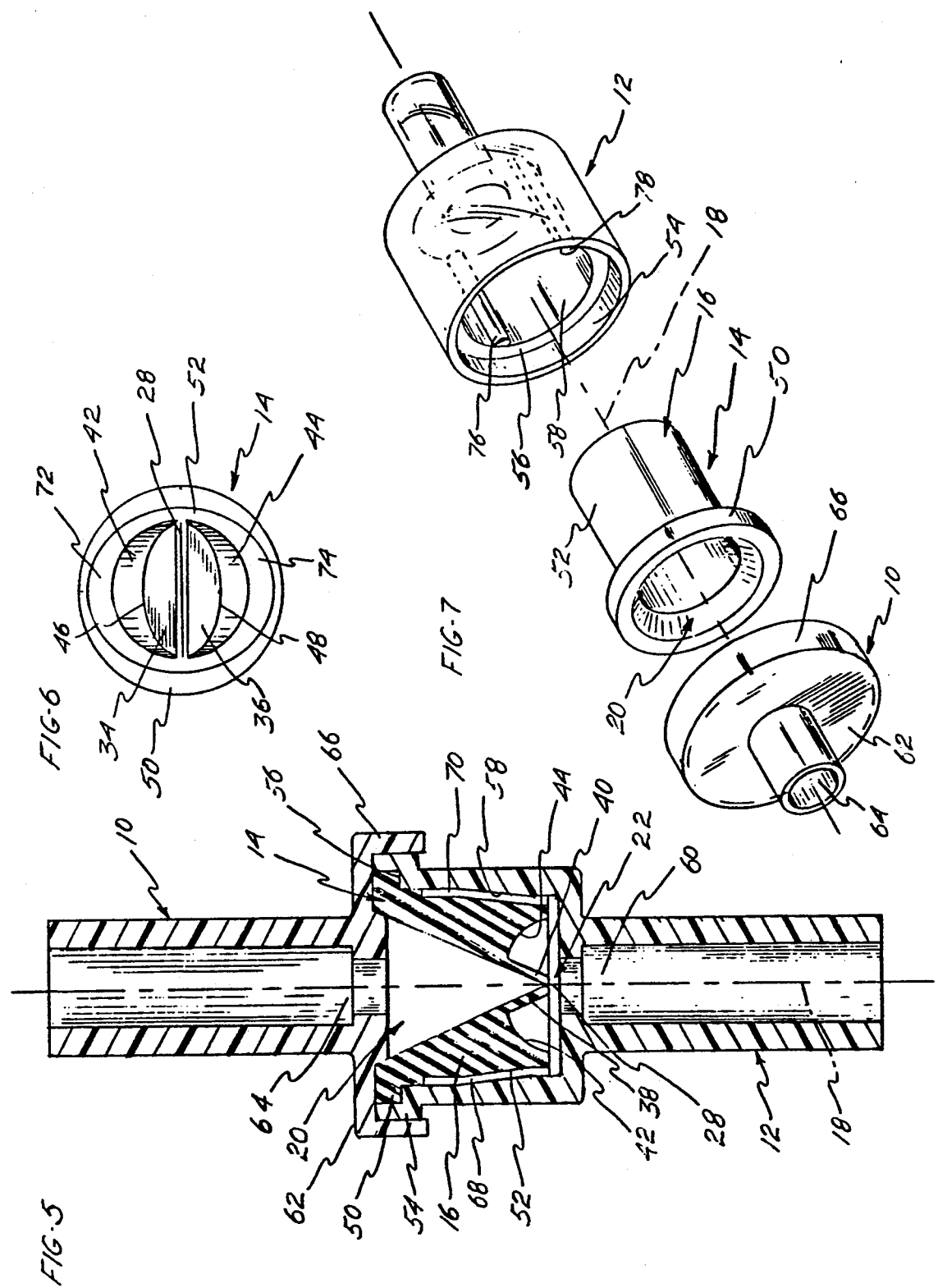

NORMALLY CLOSED DUCKBILL VALVE ASSEMBLY

BACKGROUND OF THE INVENTION

The present invention relates generally to flow regulation apparatus, and more particularly, to a valve assembly adapted to permit substantially free flow through the valve in a first direction, while preventing flow through the valve in a second, opposite direction. Even more particularly, the present invention relates to valves commonly known as the "duckbill" type.

Duckbill valves are well known and are typically in the form of a resilient flow regulator member mounted in a fluid flow path and which has as its primary operative components a pair of lips arranged in a converging relationship from an inlet end at the base of the lips to an outlet end. At the outlet end of the regulator, the lips are located adjacent to each other so as to define a slit therebetween. The duckbill regulator is often mounted within a housing in a sealed relationship so that flow through the housing must pass through the regulator as well. In a first or forward direction, flow passes into the regulator through the inlet end, moving toward the slit formed at the outlet end. The flow pressure against the resilient lips opens the slit, allowing the flow to pass out of the regulator. When flow enters the duckbill regulator from a second or a reverse direction, the flow contacts the regulator lips at its outlet end, with the flow pressure against the resilient lips holding the slit in a closed position, thereby preventing flow through the valve.

One of the requirements for one-way flow valves is that the valves must offer little resistance to fluid flow in one direction but will completely stop fluid flow in the opposite direction. Many prior art duckbill valves which are designed to firmly bias the valve lips together in order to completely prevent back flow will not fully open at low inlet pressures. Other duckbill valves which offer little resistance in forward flow conditions have a tendency to leak slightly during low back pressure conditions.

Another desirable characteristic of such valves in certain operating conditions is the ability to control the forward flow pressure at which the valve will open without significantly increasing the pressure drop through the valve. Prior art attempts to provide such valves have included providing reinforcing members around the resilient lips of the regulator, however, these prior art valve modifications have typically been accompanied with large pressure drops as the fluid passes through the valve.

Accordingly, a need exists for a valve assembly allowing fluid flow in a first direction and preventing fluid flow in a second, opposite direction in which virtually all leaks in the back flow direction are prevented, and in which means are provided for controlling the pressure at which forward flow may be initiated without restricting the flow path through the valve and creating a higher pressure drop between the inlet and outlet ends of the valve.

SUMMARY OF THE INVENTION

The present invention is a valve assembly for allowing fluid flow in a first direction and for preventing fluid flow in a second, opposite direction comprising a valve housing having an interior surface having a substantially circular cross-section and having first and second ports opening into the housing.

A flow regulator is positioned within the housing and is constructed as a single piece from an elastomeric material and includes a main body having a central longitudinal axis and a pair of substantially semi-circular valve lips which are oriented in converging relationship toward each other from the inlet end of the valve and which form a slit defining the outlet for the valve.

A pair of concave surfaces are located on either side of the slit and extend from the main body of the regulator to intersect the lips and form a pivot portion for each of the lips such that the lips may pivot away from each other to allow flow in the first direction. The connecting walls and lips define a pair of cavities within the main body and located on either side of the slit.

The main body is further provided with a pair of ribs located on diametrically opposed sides and extending parallel to the axis of the regulator in a plane containing the axis and oriented perpendicular to the slit. The ribs engage the interior surface of the housing such that the main body is biased inwardly and the lips are caused to be pressed inwardly to close the slit whereby the pressure required to initiate flow in the first direction may be precisely controlled. Thus, a positive biasing force is applied to the lips without restricting the movement of the valve lips as is the case where reinforcing members are applied directly to the valve lips.

In an alternative embodiment of the present invention, the rib members may be replaced with thickened portions of the main body wall such that the main body has a generally oval shape. In this embodiment, the thickened portions of the main body wall act in the same manner as the ribs and contact the interior surface of the housing to bias the lips together.

In a third embodiment of the invention, the outer surface of the main body may be formed with a circular shape and without ribs and the housing may be provided with ribs or raised portions for engaging the main body to bias the lips together.

Other objects and advantages of the present invention will be apparent from the following description, the accompanying drawings, and the appended claims.

BRIEF DESCRIPTION OF THE DRAWINGS

FIG. 1 is an exploded perspective view of the duckbill valve assembly of the present invention;

FIG. 2 is a plan view of the outlet end of the regulator portion of the present invention;

FIG. 3 is a sectional view taken generally along line 3—3 of FIG. 2;

FIG. 4 is a sectional view taken generally along line 4—4 of FIG. 2;

FIG. 5 is a sectional view showing the assembled duckbill valve assembly of the present invention;

FIG. 6 is a plan view similar to FIG. 2 and showing an alternative embodiment of the regulator portion of the duckbill valve; and FIG. 7 is an exploded perspective view showing a third embodiment of the present invention.

DETAILED DESCRIPTION OF THE PREFERRED EMBODIMENTS

The valve assembly of the present invention is best seen by reference to FIGS. 1 and 5. The valve assembly generally comprises a housing inlet portion 10, a housing outlet portion 12 and a regulator portion 14 which is located within the outlet portion 12. The portions 10 and 12 are preferably molded from a transparent acrylic plastic material, although other materials could also be used, depending upon the particular application for the valve assembly. Further, the flow regulator portion 14 is preferably molded as a single piece from a material having elastic properties such as an elastomeric material.

The flow regulator 14 of the preferred embodiment includes a main body 16 which is preferably substantially cylindrical and which defines a central longitudinal axis 18 of the valve. The regulator portion 14 is formed as a hollow member to define a flow path from an inlet end 20 to an outlet end 22 of the regulator portion 14. The regulator portion 14 further includes a pair of substantially planar inner walls 24, 26, as may be seen in FIGS. 3 and 4, which are arranged in converging relationship and extend through the interior of the main body 16 from the inlet end 20 to the outlet end 22. At the outlet end 22 the inner walls 24, 26 are disposed adjacent to each other to define a normally closed elongated slit 28 therebetween which is bisected by the axis 18. The inner walls are interconnected along the length of the main body 16 by a pair of generally curved side wall portions 30, 32 extending along the main body 14.

A pair of generally planar outer walls 34, 36 are disposed approximately parallel to the converging inner walls 24, 26 and extend in diverging relationship toward the inlet end 20 of the regulator portion 14 from a point adjacent to the slit 28 at the outlet end 22. The inner and outer walls together define a pair of lips 38, 40 which converge from the inlet to the outlet end of the valve regulator portion 14.

A pair of connecting walls 42, 44 having concave surfaces are located on either side of the slit 28 and extend from the main body 16 to intersect the lips 38, 40 at a point intermediate the inlet and outlet ends 20, 22 of the regulator portion 14. The intersection of the connecting walls 42, 44 with the lips 38, 40 forms a pivot portion for each of the lips 38, 40 to pivot away from each other so as to allow a fluid flow through the regulator portion 14 in a first direction from the inlet to the outlet end. In addition, the connecting walls 42, 44 and lips 38, 40 define a pair of cavities which extend into the main body from the outlet end 22 on either side of the slit 28.

As may be seen in FIGS. 2 and 3, the connecting walls 42, 44 are each defined by a locus of points which are generally equidistant from a predetermined center of curvature located along the center axis 18 whereby the intersection of the connecting walls 42, 44 with the lips 38, 40 define a pair of generally 48, as viewed in a direction perpendicular to planes containing the lips 38, 40, respectively, are formed with a generally semi-circular shape and are generally biased into a closed position and supported for pivotal movement along the semi-circular lines 46, 48.

Referring to FIG. 5, the regulator portion 14 is further provided with a flange 50 extending radially outwardly beyond an outer wall 52 defining an outer circumferential extent of the main body 16. The outlet portion 12 of the housing is provided with a collar 54 supported by a shelf 56 extending around the periphery of the outlet portion 12. The shelf 56 and collar 54 define an annular seat for receiving the flange 50 whereby the regulator portion 14 may be accurately positioned within the outlet portion 12. When the flange is in place on the valve seat of the outlet portion 12, the outer wall 52 of the main body 16, which extends substantially parallel to the axis 18 and which defines an axial extent of the main body 16, is held in spaced relation to the interior surface 58 of the outlet portion 12 and the outlet end 22 is held adjacent to an outlet port 60.

The inlet portion 10 includes a substantially circular cover plate 62 through which an inlet port 64 extends for allowing passage of fluid flow to the regulator portion 14. A circular sealing ring 66 extends perpendicularly from the cover plate 62. As may be seen in FIG. 5, the cover plate 62 engages a surface of the flange 50 whereby the flange is pressed onto the shelf surface 56 and the sealing ring 66 engages an outer surface of the collar 54 to thereby form a seal whereby fluid flow is forced to flow through the inlet port 64, through the inlet end 20 of the regulator 14 and through the slit 28 to the outlet port 60.

In order to provide a biasing force whereby the lips 38, 40 are forced together into a closed position, the main body 16 is provided with a pair of ribs 68, 70 which protrude radially from the outer wall 52 of the main body 16. The ribs 68, 70 extend parallel to the axis 18 in a plane containing the axis 18 and oriented perpendicular to the sit 28. The diameter of the outer wall 52 and the dimensions of the ribs 68, 70 are selected such that the ribs 68, 70 will engage the interior surface 58 of the outlet portion 12 in an interference fit whereby the main body is biased inwardly at the location of the ribs 68, 70. As a result of the biasing force applied to the main body 16, the connecting walls 42, 44 are caused to move inwardly toward each other whereby a greater spring force is produced along the semi-circular lines 46, 48 to positively bias the lips 38, 40 together without restricting their pivotal movement.

It should be apparent that by forming the ribs 68, 70 such that they extend an appropriate radial distance from the outer wall 52 of the main body 16, the amount of biasing force applied to the lips 38, 40 and therefore the amount of forward flow pressure required to initiate flow through the lips may be precisely controlled. In addition, the radius of curvature of the concave surfaces forming the connecting walls 42, 44 may also be varied to alter the amount of biasing force applied to the lips 38, 40 as the outer wall 52 of the main body 16 is biased inwardly.

It should be noted that the present invention is not limited to the particular rib structure shown for biasing the outer wall 52 inwardly and the biasing means may take alternative forms. For example, as may be seen in FIG. 6 in which like reference numerals are applied to like parts, the main body 16 is provided with enlarged portions formed by an increase in thickness of the outer wall 52, as indicated at 72 and 74. Thus, the outer wall 52 of the valve shown in FIG. 6 is formed as a slightly oval shape wherein the portion of the oval located on the major axis thereof contacts the interior surface 58 of the outlet portion 12 to bias the lips 38, 40 together.

In a third embodiment of the present invention, as may be seen in FIG. 7 and in which like reference numerals are applied to like parts, the interior surface 58 of the outlet portion 12 is formed as a cylindrical surface with radially inwardly extending protrusions which are depicted by ribs 76, 78. The regulator 14 of this embodiment is formed without ribs on the outer wall 52 of the main body 16, and the ribs 76, 78 act in the same manner as the ribs 68, 70 of the first embodiment to bias the wall 52 of the main body 16 inwardly.

The structure of the present invention provides an advantage over conventional prior art duckbill valves in that the lip portions 38, 40 of the valve are provided with a biasing portion formed adjacent to the semi-circular lines 46, 48 and which are located relatively close to the outlet slit 28 to provide a positive biasing force to the lips 38, 40 while also including the flexible lip portions 38, 40 which allow relatively unrestricted flow through the outlet 22 of the regulator 14. In addition, by providing the cavities on either side of the slit 28, back pressure resulting from a reverse flow condition will act on the outer surfaces 34, 36 of the lips 38, 40 to further force the lips 38, 40 together and thereby prevent reverse flow through the valve.

In a preferred construction of the present invention, the relative dimensions of the interior surface 58 of the housing outlet portion 12 and the main body 16 may be selected such that a predetermined inward biasing force is produced on the lips 38, 40 whereby a predetermined forward flow pressure is required in order to initiate flow in the first direction from the inlet 20 to the outlet 22. In such a construction, once the forward flow has been initiated, the flow will continue in a relatively unrestricted manner until the pressure drops below the predetermined level at which time the valve lips will shut, even in the absence of reverse fluid flow. Thus, the valve of the present invention is not dependent upon reverse flow pressure to bias the lips 38, 40 together to close the slit 28 for preventing reverse flow.

While the forms of apparatus herein described constitute preferred embodiments of the invention, it is to be understood that the invention is not limited to these precise forms of apparatus and that changes may be made therein without departing from the scope of the invention which is defined in the appended claims.

What is claimed is:

1. A one-way duckbill check valve for use in a flow path for permitting relatively free flow in said flow path in a first direction from a first to a second end of said valve and for preventing flow in said path in a second opposite direction, said valve comprising:
   an elongated valve body having a central longitudinal axis and an outer wall wherein said outer wall is substantially parallel to said axis and defines an axial and circumferential extent of said second end of said valve;
   a pair of valve lips positioned within the axial and circumferential extent of said second end defined by said outer wall portion of said valve body and oriented in diverging relationship to each other toward said first end of said valve;
   said valve body and lips being formed of an elastomeric material and wherein said lips define an elongated normally closed outlet opening of said valve at said second end; and
   means forming a pivot connection between said outer wall and said lips including a pair of connecting walls located on either side of said outlet opening and extending radially inwardly from said outer wall to intersect said lips along a smoothly curved edge.

2. The valve of claim 1 wherein the intersection of said connecting walls with said lips forms a pivot point for each of said lips to pivot away from said axis to allow flow in said first direction.

3. The valve of claim 1 wherein said elongated outlet opening intersects said axis, and said connecting walls intersect said lips along a locus of point substantially equidistant from a predetermined center of curvature.

4. The valve of claim 3 wherein said connecting walls are formed with concave surfaces and said concave surfaces are defined by a locus of points substantially equidistant from said predetermined center of curvature.

5. The valve of claim 1 wherein said outer wall includes enlarged portions located in a plane containing the axis and oriented perpendicular to said outlet opening, wherein said enlarged portions extend radially from said valve body.

6. The valve of claim 5 wherein said enlarged portions comprise a pair of diametrically opposed ribs.

7. The valve of claim 5 wherein said enlarged portions comprise an increase in the thickness of said outer wall on diametrically opposed sides of said valve such that the circumference of said outer wall defines a generally oval shape.

8. A one-way duckbill check valve assembly for use in a flow path for permitting relatively free flow in said flow path in a first direction from a first to a second end of said valve and for preventing flow in said path in a second opposite direction, said valve comprising:
   a housing;
   a valve body located within said housing and having a central longitudinal axis and an outer wall;
   a pair of valve lips mounted to said valve body within said outer wall and oriented in diverging relationship to each other toward said first end to said valve;
   means forming a pivot connection between said outer wall and said lips;
   means for biasing said outer wall inwardly whereby said pivot connection transmits a force to bias said lips together;
   said valve body and lips being formed of an elastomeric material and wherein said lips define an elongated normally closed outlet opening of said valve at said second end; and
   said means forming a pivot connection between said outer wall and said lips including a pair of connecting walls located on either side of said outlet opening and extending radially inwardly from said outer wall to intersect said lips along a smoothly curved edge.

9. The valve of claim 8 wherein said elongated outlet opening intersects said axis, and said connecting walls intersect said lips along a locus of points substantially equidistant from a predetermined center of curvature.

10. The valve of claim 8 wherein said means for biasing said outer walls inwardly include enlarged portions located on diametrically opposite sides of said outer wall and intersecting a line passing through said axis perpendicular to said outlet opening.

11. The valve of claim 10 wherein said housing includes an inner wall and said enlarged portions contact and are biased inwardly by said inner wall.

12. The valve of claim 8 wherein said housing includes an inner wall and said means for biasing said outer wall inwardly include a pair of diametrically opposed raised portions located on said inner wall for contacting and forcing said outer wall inwardly.

13. A one-way duckbill valve assembly for use in a flow path for permitting relatively free flow in said flow path in a first direction and for preventing flow in said path in a second, opposite direction, said assembly comprising:

a housing defining a housing interior having an interior surface and having first and second ports opening into said housing;

a flow regulator constructed as a single piece from an elastomeric material and including a substantially cylindrical main body having a central longitudinal axis, said main body defining a flow path through said valve assembly;

a pair of substantially planar inner walls arranged in converging relationship and extending through the interior of said main body from an inlet end adjacent to said first port to an outlet end adjacent to said second port where said inner walls are disposed adjacent to each other to define a normally closed slit therebetween which intersects said axis, said inner walls being interconnected along the length of said main body by side wall portions of said main body;

a pair of substantially planar outer walls disposed approximately parallel to said inner walls and extending in diverging relationship toward said inlet end from a point adjacent to said slit to define with said inner walls a pair of lips converging from said inlet to said outlet end;

a pair of connecting walls having concave surfaces on either side of said slit and extending radially inwardly from said substantially cylindrical main body to intersect said lips and form a pivot portion for each of said lips to pivot away from each other to allow flow in said first direction and wherein said connecting walls and said lips define a pair of cavities within said main body on either side of said slit;

said concave surfaces and said intersection of said connecting walls with said lips being located along a locus of points which are substantially equidistant from a predetermined center of curvature;

a substantially circular flange extending from said main body adjacent to said inlet end for forming a seal between said housing and said regulator such that flow in said first direction is from said inlet port, through said inlet end, through said slit and to said outlet end; and a pair of ribs located on diametrically opposed sides of said main body and extending parallel to said axis in a plane containing said axis and oriented perpendicular to said slit, said ribs engaging said substantially cylindrical interior surface of said housing such that said main body is biased inwardly and said lips are caused to be pressed inwardly to close said slit whereby the pressure required to initiate flow in said first direction may be precisely controlled.

* * * * *